Nov. 1, 1932.  R. REINECKER  1,885,628
ARBOR SUPPORT FOR GEAR CUTTING MACHINES
Filed Sept. 22, 1931
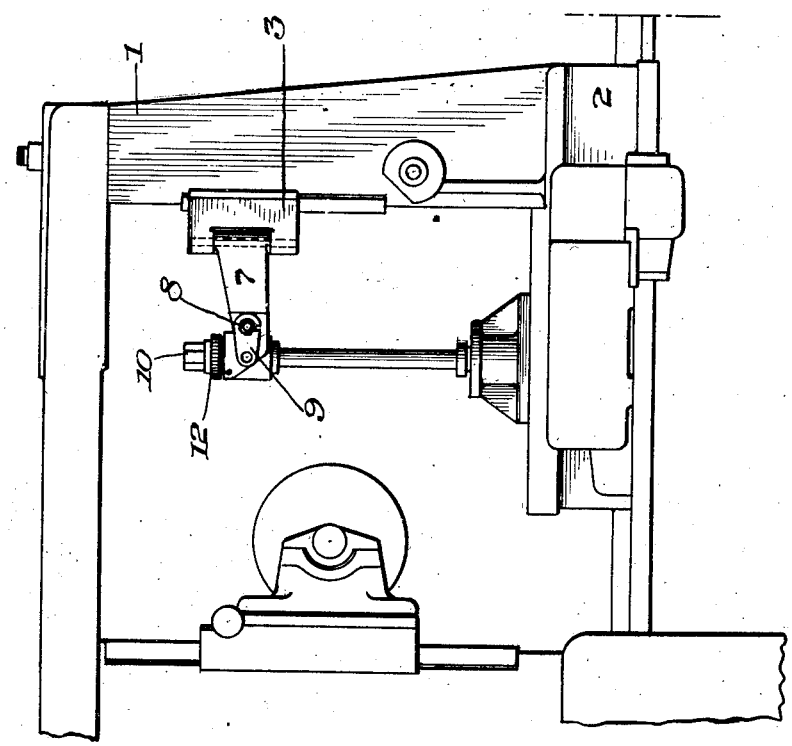
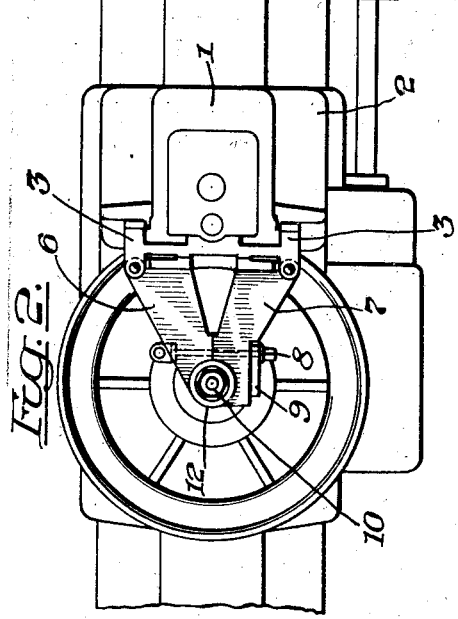
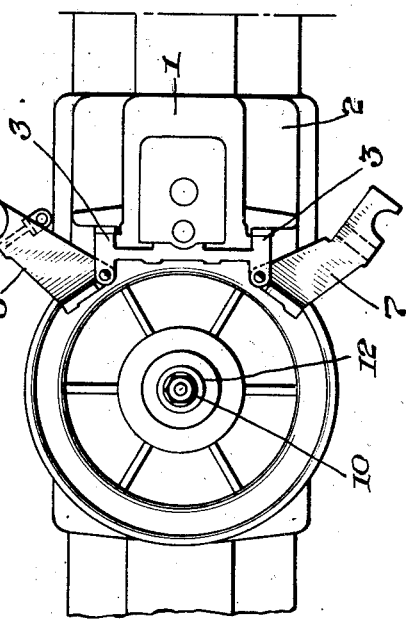
INVENTOR
Richard Reinecker
BY
ATTORNEY Patented Nov. 1, 1932

1,885,628

UNITED STATES PATENT OFFICE

RICHARD REINECKER, OF CHEMNITZ, GERMANY, ASSIGNOR TO J. E. REINECKER, A. G., OF CHEMNITZ, GERMANY

ARBOR SUPPORT FOR GEAR CUTTING MACHINES

Application filed September 22, 1931, Serial No. 564,347, and in Germany March 10, 1931.

This invention relates to metal working machines in which the cutter or work spindle is provided with an end support or bearing, it particularly relating to gear cutting and milling machines, the object of the invention being to provide an improved spindle supporting member for such a machine.

In gear cutting machines having a vertical work arbor, it is essential that the same be supported at its upper end to prevent deflection through the cutting pressure and in the various designs of arbor supports in use, it is necessary either to dismount the arm containing the bearing entirely or move this arm upward until it clears the arbor so that it can be swung out of the way in a horizontal plane or in a vertical plane.

The object of the present invention is to provide an outboard bearing for the work arbor which does not have to be entirely dismounted or moved out of the way or above the arbor in a vertical direction to permit the loading of the work on the arbor and, therefore, the primary object of the present improvement is the provision of a bearing arm so constructed that the arbor may be freed for loading or unloading without the necessity of moving that arm above the arbor in order to swing the arm either horizontally or vertically away from the arbor and this object is accomplished by providing a split arm and bearing, each half of which can be swung out of the way on a vertical axis without shifting or displacing that arm relatively to the arbor in a vertical direction to clear the arbor.

In the drawing accompanying and forming a part of this specification, Fig. 1 is a side view of a gear hobbing machine having this improved arbor supporting means.

Fig. 2 is a top view thereof illustrating the arms in position engaging the arbor, and Fig. 3 is a similar view illustrating the arms swung away from the arbor.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawing since the invention is capable of other embodiments, and that the phraseology which I employ is for the purpose of description and not of limitation.

In the preferred form thereof shown, the arbor support 1 comprises a suitable box-like column bolted to a table slide 2 and on this column is mounted a slide 3 shiftable in a vertical direction by any suitable means as by a screw and nut or rack and pinion.

To this slide 3 is pivotally connected a pair of swinging arms 6 and 7, each arm being vertically pivoted so that it may be swung in a horizontal plane toward and from the arbor. When the two arms are swung into position to engage the arbor, each outer end of the arm being provided with a concaved end or seat for the reception of the arbor, they are clamped together by means of a bolt or other suitable fastening 8 and this bolt is maintained in position by a lock plate 9 swingable to engage the bolt at the inside of the nut or head thereof. When this lock plate is lifted, the bolt 8 can be pushed through the openings in the arms so as to release one arm from the other and thus permit the arms to be swung away from the arbor, whereupon the work can be placed on the arbor and removed therefrom, after, of course, the nut 10 and bushing 12 have been removed from the arbor 11.

As hereinbefore pointed out, in arbor supports heretofore used, where swinging arms have been utilized, it has been necessary to first shift the slide 3 above the arbor so as to permit the arm to be swung either side-wise or vertically away from the arbor, but in the present improvement, it will be observed that the arms may be swung away from the arbor without the necessity of unfastening the slide 3 and shifting it above the arbor so that the arbor can be more quickly released and, consequently, the work more quickly placed on the arbor and removed therefrom without in any way interfering with the rigidity of the support provided for the arbor.

It will be observed that, in the preferred construction shown, the slide member 3 has the swinging arms so pivoted thereto that these arms are spaced quite a distance apart when they are swung away from each other, thus very much facilitating the placement or the removal of the work on the arbor. In other words, the construction is such that when the arms are swung away from the arbor and back toward the column, they are entirely out of the way of the work to be handled.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. The combination of a supporting column, a slide member mounted thereon, an arbor supporting arm comprising a pair of swingable members vertically pivoted on said slide and swingable toward and from each other in a horizontal plane, and means for clamping the ends of said members together to support the upper end of an arbor.

2. The combination of a supporting column, a slide member mounted thereon, a pair of swingable arms vertically pivoted at apposite sides of said slide and swingable toward and from each other in a horizontal plane, said arms having curved ends adapted to receive the upper end of an arbor, and means for clamping the ends of said arms together.

3. The combination of a supporting column, a slide member mounted thereon, a pair of swingable arms vertically pivoted at opposite sides of said slide and swingable toward and from each other in a horizontal plane, said arms having curved ends adapted to receive the upper end of an arbor, and means for clamping the ends of said arms together and comprising a bolt passing through the ends of said arms.

4. The combination of a supporting column, a slide member mounted thereon, a pair of swingable arms vertically pivoted at opposite sides of said slide and swingable toward and from each other in a horizontal plane, said arms having curved ends adapted to receive the upper end of an arbor, and means for clamping the ends of said arms together and comprising a bolt passing through the ends of said arms and means for locking said bolt against withdrawal.

5. The combination of a supporting column, a slide member mounted thereon, a pair of swingable arms vertically pivoted at opposite sides of said slide and swingable toward and from each other in a horizontal plane, said arms having curved ends adapted to receive the upper end of an arbor, and means for clamping the ends of said arms together and comprising a bolt passing through the ends of said arms and means for locking said bolt against withdrawal and comprising a swingable lock member.

6. The combination of an upright supporting column, a slide member mounted thereon, a pair of swingable arms vertically pivoted on said slide member and swingable in a horizontal plane, said arms having curved seats for the reception of an arbor and the ends of said arms having openings for the passage of a locking bolt and a lock member cooperating with the end of said bolt for preventing the withdrawal thereof when the arms are clamped to the arbor.

7. The combination of a box type supporting column, a slide member mounted thereon of relatively great width, a pair of swingable arms vertically pivoted on said slide member at the opposite sides thereof whereby when swung away from the arbor they are out of the way of the work, said arms being swingable in a horizontal plane toward the arbor and having arbor receiving seats and means for clamping the arms together to support the arbor.

8. In a machine of the class described, the combination of an upright column having a guide-way, an arbor supported in front thereof, a slide mounted on said guide-way and having a face wider than said column, a pair of swingable arm members vertically pivoted to said slide at the opposite sides thereof whereby when swung apart they will not interfere with the handling of the work, said swingable members having arbor receiving seats for the reception of the arbor and means for clamping the ends of the swingable members together around the arbor, thereby to support the free end thereof and means for preventing the release of said clamping means, said swingable members being effective to release the arbor at any position of the slide on the column without the necessity of shifting the slide above the arbor.

Signed at Chemnitz-14 Germany, this 10th day of September 1931.

RICHARD REINECKER.